Aug. 13, 1963   R. J. WRIGHTON   3,100,609
SAFETY HARNESS DEVICE
Filed Nov. 23, 1959   3 Sheets-Sheet 1
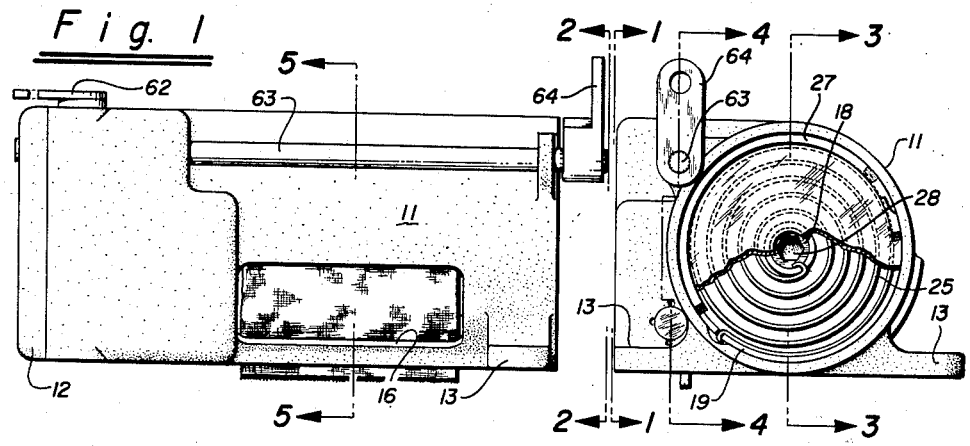
INVENTOR
Robert J. Wrighton
by Paul B Hunter
Attorney Aug. 13, 1963　　　R. J. WRIGHTON　　　3,100,609
SAFETY HARNESS DEVICE
Filed Nov. 23, 1959　　　　　　　　　　　　3 Sheets-Sheet 2

INVENTOR

Robert J. Wrighton
by Paul B. Hunter
Attorney

INVENTOR
Robert J. Wrighton
by Paul B. Hunter
Attorney

United States Patent Office 3,100,609
Patented Aug. 13, 1963

3,100,609
SAFETY HARNESS DEVICE
Robert J. Wrighton, Newport Beach, Calif., assignor to Pacific Scientific Company, San Francisco, Calif., a corporation of California
Filed Nov. 23, 1959, Ser. No. 854,869
5 Claims. (Cl. 242—107.4)

This invention relates, in general, to safety harness devices for use in protecting persons in moving vehicles, and, more particularly, to a novel improved inertia-operated safety device utilized to lock automatically persons, such as airplane pilots, in their seats during crashes and the like.

The present safety harness device is responsive to the rate of acceleration of the pilot, passenger or user, with respect to his seat and operates directly in response to the tensions exerted on a cable or webbing resulting from forces applied to the webbing through the pilot's shoulder harness by movements of his body, the device operating automatically upon sudden violent movement of the body to secure the pilot or user safely in his seat. This present invention discloses a novel type of such inertia-operated device which incorporates novel improved features over prior art safety devices.

The principal object of the present invention is to provide an exceedingly light-weight, rugged and dependable safety harness device operating on the principle of rate of acceleration of the harness cable or webbing to retain the user in his seat in the event of sudden or dangerous movement of the vehicle, the device incorporating various safety features enhancing its dependability in use.

One feature of the present invention is the provision of an inertia-operated safety device wherein the cable or webbing is locked up automatically should it exceed a certain acceleration due to the pull exerted thereon by the pilot or user thereof, the safety device being provided with a novel means for preventing the reel from relocking during that instant of time that the reel is being unlocked, thereby preventing the reel from locking when a tension is exerted thereon by the pilot.

Another feature of the present invention is the provision of an inertia-operated safety device provided with a novel automatic unlock mechanism for automatically unlocking the device when the acceleration force causing the lock-up has been removed from the webbing or cable.

These and other features and advantages of this invention will become apparent after perusal of the following description of this invention disclosed in the drawings wherein:

FIG. 1 is a front elevation view of one embodiment of the present invention utilized in a reel type of safety device having a webbing tension member;

FIG. 2 is an end view partly cut away of the apparatus taken along section line 2—2 of FIG. 1 in the direction of the arrows;

FIG. 3 is a longitudinal section view of the apparatus taken along section line 3—3 of FIG. 2 in the direction of the arrows;

FIG. 4 is a longitudinal view partly in section of the apparatus taken along section line 4—4 in FIG. 2;

Figure 8:
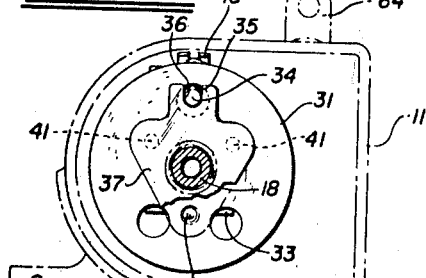
Figure 6:
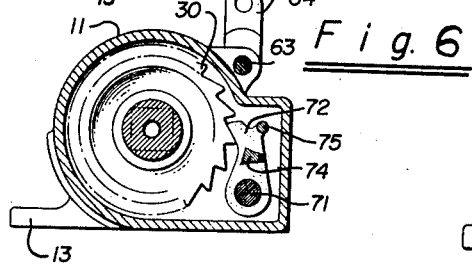
FIG. 6 is a cross-section view of the novel device taken along section line 6—6 in FIG. 4 showing the device in its locked position.
Figure 12:
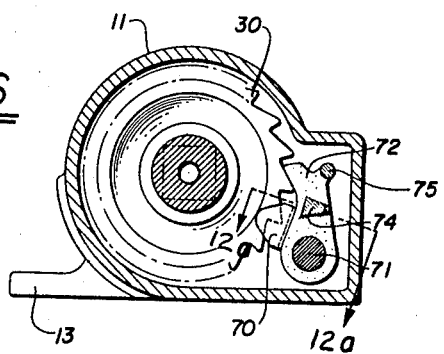
Figure 12A:
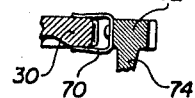
Figures 9, 11:
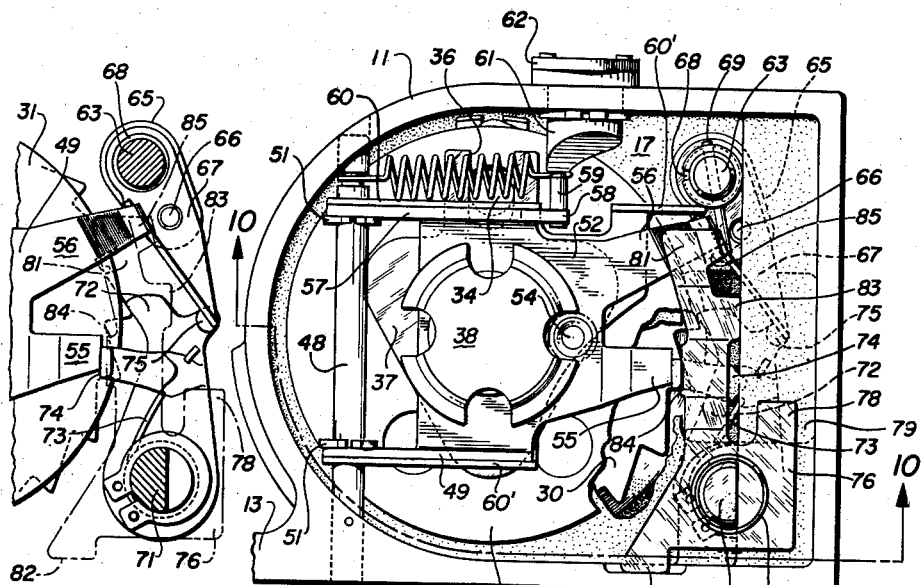
Figure 10:
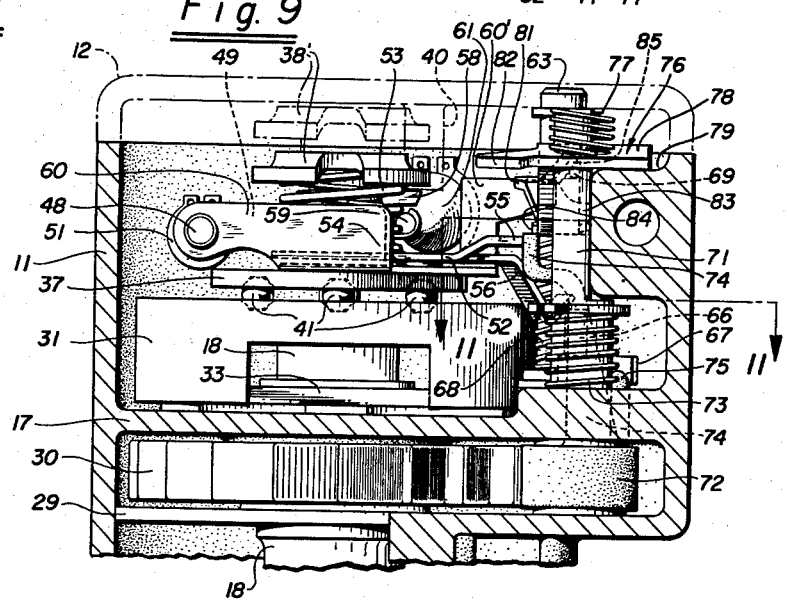

7. Is a cross-section view of the device, also in the locked position, taken along section line 7—7 in FIG. 3;

FIG. 8 is a cross-section of the device taken along section line 8—8 in FIG. 3;

FIG. 9 is an end view of the device in its unlocked position, taken along the section line 9—9 in FIG. 4, with the end cover removed;

FIG. 10 is a cross-section view of a portion of the device taken along section line 10—10 in FIG. 9;

FIG. 11 is a cross-section view of a portion of the device taken along section line 11—11 in FIG. 10;

FIG. 12 is a cross-section view of this novel device wherein an automatic unlocking mechanism is disclosed for use at times in lieu of the manual unlock mechanism, and FIG. 12a is a cross-section view of a portion of the device of FIG. 12 taken along section line 12a—12a.

Similar characters of reference are used in the above figures to designate corresponding parts.

Although the present embodiment is a reel and webbing type of inertia-operated safety device, it should be understood that this invention applies equally well to cable and reel types as well as other types of safety devices. A complete detailed description of the construction of this device will first be given, followed by a full explanation of its operation. A safety reel of this general type has been disclosed and claimed in U.S. patent application Serial No. 644,270 filed on March 6, 1957, by Clifford E. Cushman and Robert J. Wrighton, entitled Safety Harness Device, now Patent 3,018,065 issued January 23, 1962, the present reel incorporating new and improved features which are specifically disclosed and claimed in this application.

Figure 5A:
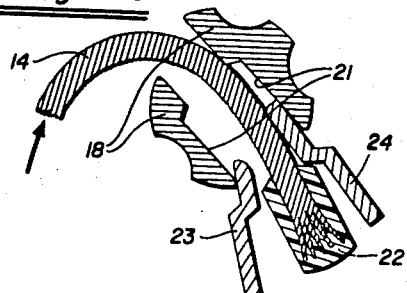
FIG. 5a is a cross-section view of a portion of the device showing the method of coupling the webbing to the shaft or reel.
Figure 5:
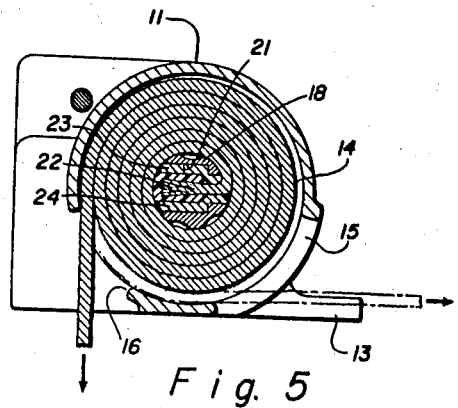
FIG. 5 is a cross-section view of the apparatus taken along section line 5—5 of FIG. 3.

Referring now to the drawings, this safety apparatus comprises a metallic casing 11 as of aluminum alloy having a removable end cover 12 secured thereon. Integral lugs 13 are provided on the casing 11 for mounting the safety device on a seat or the like. This device may be mounted in a horizontal position as shown in FIG. 5, in which event the tension member or webbing 14 may extend through opening 15 in the casing as shown in dot-dash lines; or it may be mounted on a vertical surface, that is, rotated 90° clockwise with respect to FIG. 5, in which event the webbing 14 may extend out through the opening 16 in the casing 11.

Located within the casing 11 is a wall 17 having a central opening therein which serves as a bearing for one end of the webbing reel shaft 18, the opposite end of reel or shaft 18 being rotatably mounted in an annular cup-shaped wall member 19. The central section of shaft 18 is enlarged and has an elongated slot 21 therethrough, the slot being wider on one side of the shaft than on the other (see FIGS. 5 and 5a).

The webbing 14, the outer end of which is adapted to be coupled to the shoulder harness of the pilot, is removably mounted at its inner end to the shaft 18 within the elongated slot 21 in such manner that the webbing 14 may be easily and rapidly removed from the shaft 18 for replacement without dismantling this device. The inner end of webbing 14 is firmly embedded in an elongated plastic end termination 22 having a substantially rectangular cross-section. A pair of elongated web-retaining inserts 23 and 24 as of metal are provided, between which the end termination 22 is sandwiched, the inserts 23, 24 and termination 22 being snugly wedged within the slot 21 in shaft 18 from its wide side. The webbing 14 extends out through the narrow side of the slot 21 and around the shaft 18. To remove the webbing 14 from the device, the webbing is fully unwound from the shaft 18 and then the termination 22 is pushed out from the slot 21 in the shaft 18, the inserts 23 and 24 permitting easy decoupling, and the webbing withdrawn through either of the openings 15 and 16. A new webbing may then be threaded into the slot 21 and pulled through until its termination 22 is embedded in the slot 21.

A spiral power spring 25 encircles the right-hand end (FIG. 3) of the shaft 18, the inner end of the spring 25 being secured to the shaft 18 and the outer end to the cup-shaped wall member 19. The spring 25 is so tensioned as to rotate the shaft 18 to wind the webbing 14 thereon. A protective end cover 26 is provided and is held in place by retaining rings 27. The end cover 26 is provided with a central opening 26' through which a hexagonal wrench may be inserted into the hexagonal opening 28 in the shaft 18 so that the shaft 18 may be held in any position against the tension of spring 25. Thus, the shaft 18 may be held in the position in which the webbing 14 is fully unwound from the shaft 18, so that the webbing 14 may be removed and replaced with new webbing. An annular webbing shield 29 is provided on the shaft 18. Integral with the shaft 18 is a ratchet 30 located adjacent the wall 17.

An annular flywheel 31 is rotatably mounted on the shaft 18 and is held in place by means of a retaining ring 32. Fixedly secured on the shaft 18 so as to rotate therewith is a torque plate 33 having a torque pin 34 embedded therein. The torque pin 34 extends through an opening 35 in the flywheel and is snugly fitted within a slot 36 in a substantially triangular-shaped thrust plate 37 which is rotatably mounted on the shaft 18. A compensator screw 38 is screwed into a threaded bore in the left-hand end portion (FIG. 3) of the shaft 18. A helical thrust plate spring 39 encircles the screw 38 and is compressed between the head 38' of screw 38 and the thrust plate 37. Three steel balls 41 are sandwiched between the thrust plate 37 and the left-hand surface of the flywheel 31, the balls nesting in indentations in the thrust plate and flywheel surfaces. Thus, the thrust plate 37 is at all times pressed against the steel balls 31 which in turn are pressed against the flywheel 31.

Figure 7:
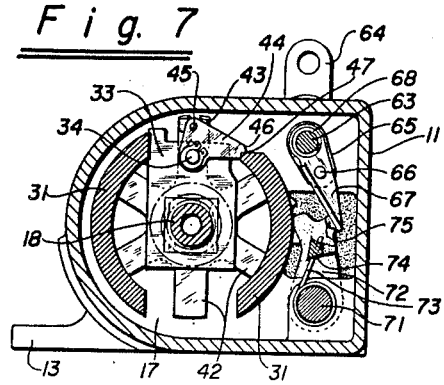

An annular retraction anti-lock member 42 (FIGS. 3 and 7) having radially extending fingers is rotatably mounted on the shaft 18 between the torque plate 33 and wall 17. One of said fingers 43 has a slot in the end thereof. An anti-lock lever 44 is pivotally mounted on the torque pin 34, the lever 44 having a small drive pin 45 embedded therein. The outer end of the drive pin 45 extends into the slot in finger 43. The outer end 46 of lever 44 has a notch therein adapted to accommodate one edge 47 of an opening cut into the periphery of the flywheel 31. The operation of this anti-lock mechanism will be fully explained hereinafter.

A sear pivot pin 48 is mounted in the casing 11 off to one side of the main axis through the shaft 18 (see particularly FIGS. 3, 4, 9 and 10). A U-shaped sear 49 is pivotally mounted on pin 48 and held in place by retaining rings 51. A second U-shaped sear 60 is also pivotally mounted on pin 48 straddling the sear 49, this second sear being provided with an extension arm and cam 60. The shaft 18 extends through an opening in the base surface 52 of the sear 49 and also sear 60. A helical sear spring 53 encircles the compensator screw 38 and is compressed between the head 38' of the screw 38 and the base surface 52 of the sear 49, the undersurface of said sear base 52 (as viewed in FIG. 10) having a dimple 54 which presses firmly against the second sear 60 which in turn presses against the plate 37. Two integral fingers 55 and 56 extend from the base 52 of sear 49.

One leg 57 of the sear 49 is provided with a projection 58 adapted to be engaged by a pin 59 set off-center on an auxiliary control rod 61 rotatably mounted in the casing 11. Control rod 61 is secured to an auxiliary control lever 62 outside of the casing 11.

A main control shaft 63 is rotatably mounted in the casing 11 and is secured to an external control lever 64 which, as will be explained subsequently, serves as the main control for manually locking and releasing this safety device. An inner control lever 65 is fixedly secured to the shaft 63, the outer end of the lever 65 having a control shaft torque pin 66 embedded therein. A dog retraction lever 67 is loosely mounted on the main control shaft 63 adjacent the inner control lever 65, the control shaft torque pin 66 extending through a slightly enlarged opening in the dog retraction lever 67. A control shaft spring 68 is compressed between a pin 69 mounted in control shaft 63 and the dog retraction lever 67. Thus, dog retraction lever 67 may not rotate relative to shaft 63, except very slightly since the opening in lever 67 accommodating torque pin 66 is slightly enlarged, but lever 67 may move longitudinally relative to shaft 63 against the tension of spring 68 for reasons set forth hereinafter. The outer end of torque pin 66 is adapted to engage finger 56 of sear 49.

A lock dog shaft 71 is fixedly secured within the casing 11 off to one side of the main shaft 18 (see FIGS. 4, 6, 7, 9 and 10). A lock dog 72 is rotatably mounted on the lock dog shaft 71 in a position to engage the teeth on ratchet wheel 30 in locking fashion. A spring 73 is provided encircling said shaft 71 and engaging an elongated finger 74 integral with and extending from the lock dog 72, the spring being tensioned so as to tend to urge the lock dog 72 into locking engagement with the ratchet wheel 30. The outer end of the elongated finger 74 is crooked slightly and engages the outer end of finger 55 on sear 49. A second finger 75 integral with the lock tapered dog 72 extends out from the dog, its tapered end surface engaging the outer end of dog retraction lever 67.

An anti-rebound lever 76 is movably mounted on lock-dog shaft 71, a spring 77 urging the lever in a downward direction as viewed in FIG. 10. A projection 78 on lever 76 forms a stop against the internal surface 79 of casing 11 to permit the free end 81 of lever 76 to drop only a fixed distance. Slight extensions 82 and 83 of lever 76 engage inner surfaces of casing 11 to prevent any rotational movement of lever 76 on shaft 71. A slight projection 84 on the lever 76 is adapted to ride on the outer end of finger 74 of lock dog 72 when lock dog 72 is not engaging the ratchet wheel 30 and to drop down behind the finger 74 when the lock dog rotates into engagement with the ratchet wheel, as will be subsequently explained. The pin 69 in control shaft 63 is arranged to engage the tilted end 85 of the anti-rebound lever 76.

A detailed description of the operation of this novel device embodying the present invention will now be given with reference to its use by a pilot in an aircraft. The apparatus is shown in its normal operating position in FIGS. 1 through 5 and 8 through 10, that is to say, when it has not been manually or automatically locked. As the pilot moves about in his seat in a normal manner to control his craft, his shoulder harness likewise moves and pulls on the webbing 14. The webbing unwinds from the webbing shaft 18, the shaft rotating counter-clockwise (FIG. 5) and with it the integral ratchet wheel 30. As the shaft rotates, it carries the torque plate 33 with it, and, through torque pin 34, also rotates the thrust plate 37. Since the thrust plate 37 is pressed against the steel balls 41 and thus engages the flywheel 31, the flywheel is rotated along with the shaft 18. In winding up, when the force is relaxed on the webbing 14, the power spring 25 rotates the shaft 18 clockwise (FIG. 5) along with the flywheel 31.

Should the pilot desire to secure himself safely in his seat when, for example, a crash is imminent, he leans back in his seat and the slack in the harness is taken up by the safety device. The pilot then operates the main control lever 64 by a suitable control cable (not shown), thereby rotating the inner control lever 65 clockwise, as viewed in FIGS. 9 and 11. The control shaft torque pin 66 engages the outer end of finger 56 on sear 49 and slides thereunder, the pin 66 raising the finger 56 and with it the finger 55 until the end of spring-loaded finger 74 on lock dog 72 can slip under finger 55, thus permitting lock dog 72 to rotate counter-clockwise as viewed in FIG. 9 into locking engagement with the teeth of ratchet wheel 30 (see FIG. 6). The lock dog retraction lever 67 rotates with the pin 66 and rides up and over the inclined end surface of the lock dog finger 75. If the pilot manually locks the device while leaning forward, the power spring 25 will still rotate the shaft 18 when the pilot sits back thereby to reel in the slack, the lock dog 72 falling in behind each successive ratchet tooth.

This device will thereafter remain clocked until the inner control lever 65 is manually rotated counter-clockwise as viewed in FIGS. 9 and 11 to release the device. When rotated in the release direction, the outer end of lock dog retraction lever 67 engages the back side of the inclined lock dog finger 75 and drives the finger 75, and thus the lock dog, back to the release position, where the sear finger 55 falls down behind the projecting finger 74 to hold the lock dog in the released position shown in FIGS. 9 and 11.

The novel apparatus of this invention will automatically operate to lock up the webbing 14 during crashes and the like if the pilot does not manually lock it. This safety device is so arranged that when any loading on the webbing 14 causing an acceleration of a particular number of G's or over occurs, depending on the setting of the device, this webbing 14 will be locked up. Assume that the aircraft in landing strikes an object and decelerates rapidly, pitching the pilot forward in his seat, or that the craft yaws or descends suddenly, so that the pilot's body exerts a loading of this particular number of G's acceleration on the cable 7. When the sharp jerk occurs on the webbing 14, it tends to rotate the shaft 18, torque plate 33, and, through pin 34, thrust plate 37, at a rapid rate of acceleration. The thrust plate 37, through steel balls 41, tends to rotate the flywheel 31 along with the shaft 18, but this flywheel is made of a relatively heavy metal mass, and it tends to remain stationary when the force is first applied. This tendency of the flywheel to remain stationary overcomes the spring-loading force of the thrust plate and there is, therefore, a relative rotational movement between the thrust plate 37 and the flywheel 31, and this causes the thrust plate to ride up on the steel balls and move to the left as viewed in FIG. 3, or move upwardly as viewed in FIG. 10. The thrust plate 37, through sear 60, bears against the dimple 54 in sear 49, thus rotating sear 49 about its pivot pin 48 against the tension of sear spring 53. The sear finger 55 is thus disengaged from the lock dog finger 74 and the lock dog 72 rotates under pressure of spring 73 to engage the ratchet teeth and thus locks the ratchet wheel 30 to prevent paying out of webbing 14, and hence retains the user in his seat. In this automatically-locked position, the apparatus will still reel in the webbing should the user move back in his seat in the same manner as explained above when manually locked.

The sear spring 53 is utilized to control the exact number of G's of acceleration on the webbing which are necessary to lock this safety device automatically. The tension of sear spring 53 may be varied by screwing the compensation screw 38 into or out of the shaft 18 to increase or decrease the tension, and thus raise or lower the G value of operation. The screw 38 may be rotated in 90° segments and held in position by means of the holding pin 40. The components of this safety device may be selected as to size, weight, etc., so that the device may cover wide ranges of accelerations. In one embodiment of this device constructed, the locking acceleration was set at 2 G's.

To release from the automatic lock position, the pilot rotates the lever device 64 to the manual lock position such that the lock dog retraction lever 67 rides up and over the inclined end of lock dog finger 75. Reverse rotation of lever 64 then causes the retraction lever 67 to engage the finger 75 and rotate the lock dog 72 to its release position, where the sear finger 55 falls behind the projecting finger 74 to hold the lock dog in the released position.

This safety device is provided with an anti-rebound means for preventing the lock dog 72, once it has been freed to contact the ratchet wheel 30 and lock this device, from falsely releasing, that is returning to the normal unlocked position before manual release by the pilot. This false release could possibly occur, for example, if the device were locked initially with a portion of the webbing 14 unwound from the shaft 18. When the shaft rotates under the power of spring 25 to take up the slack, the lock dog 72 rides over the teeth of the ratchet wheel 30 and has a tendency to bounce. If the lock dog were to bounce high enough and finger 74 were to move out from under sear finger 55, the device would be released. Anti-rebound lever 76 prevents such false operation. The central section of this lever 76 rests on the end of lock dog finger 74 under the pressure of spring 73 when the lock dog 72 is in its normal unlocked position. When the lock dog rotates into contact with the ratchet wheel 30, however, the projection 85 on spring-loaded lever 76 drops behind the finger 74 and prevents the finger 74 from subsequently moving out from under the sear finger 55. When control shaft 63 is rotated to release this safety device as described above, pin 69 in shaft 63 engages and lifts the end 81 of lever 76 and thus allows the end of lock dog finger 74 to move out from under sear finger 55.

This safety device is also provided with a novel means for preventing the reel from relocking during the period that the reel is being unlocked, such relocking, for example, ordinarily occurring if the reel is unlocked at a time when a substantial load, for example 25 lbs., is being exerted on the harness strap or cable; such a load could occur, of course, if the pilot's body is placing a strain on the strap at the same time he is operating the unlocking mechanism. This stress in the cable or webbing would be sufficient at times, when transmitted to the acceleration sensing flywheel, to cause the flywheel to actuate and relock the reel. This novel lock-up preventing means includes the second U-shaped sear device 60. As the control shaft 63 is rotated to release this safety device from lock-up, as described above, the pin 69, in addition to lifting the end 81 of lever 76, rides over the cam 60′ of the second sear 60 and prevents movement of the sear 60 in the vertical direction as viewed in FIG. 10. The base of this second sear rests firmly against the thrust plate 37 and thus restrains upward movement of the thrust plate 37 (as viewed in FIG. 10) due to any tendency for relative rotation between the flywheel 31 and the spool 18. It can therefore be seen that no lockup of this device can occur during the time that the pin 69 extends over the cam 60′. When the control shaft 63, and thus pin 69, are returned to their normal position, the second sear 60 is free to move, and thus the automatic lock feature is returned to normal operation.

It is understood that this safety device works on the principle that the inertia flywheel 31 tends to remain stationary when an angular acceleration of the webbing reel 18 and thrust plate is produced, the rotational movement of the harness reel relative to the inertia member resulting in the automatic locking of the webbing. If the webbing 14 is reeled in at excessive speeds, the inertia flywheel will tend to keep rotating when the webbing reel 18 is brought to a sudden stop by a retarding force acting on the webbing 14. Any resultant relative rotation between the flywheel and thrust plate 37 may result in a tipping of the sear 49 and automatic locking when it is not desired. An antilocking apparatus is utilized in this safety device and is clearly seen in FIG. 7. This antilocking structure, effective only during rotation of the webbing shaft 18 in the wind-up direction, comprises anti-lock member 42 rotatably mounted on the shaft 18 and having a plurality of radially extending fingers which bear frictionally against the stationary wall 17. As viewed in FIG. 7, as the webbing shaft 18 rotates clockwise in the unwind direction, the torque plate 33 and torque pin 34 rotate with the shaft 18. Thus, the anti-lock lever 44 pivotally mounted on pin 34 tends to drive the anti-lock member rotationally with the shaft 18 through drive pin 45 and slotted finger 43. However, due to the frictional bearing of the fingers of member 42 on the wall 17, the member 42 resists rotation and thus causes anti-lock lever 44 to pivot counter-clockwise so that its end 46 moves out of contact with the edge 47 of the opening in the flywheel 31, thus freeing flywheel 31 so that it may rotate relative to the shaft 18 for automatic locking purposes during webbing unwinding. After lever 44 is disengaged from the flywheel 31, the anti-lock member 42 rotates with the shaft 18. As the shaft 18 commences to rotate counter-clockwise in the windup direction, member 42, due to its drag on wall 17, resists rotation and anti-lock lever 44 is driven by pin 45 in a clockwise pivotal direction until end 46 engages flywheel 31 at edge 47. The flywheel is thus coupled to the webbing shaft 18 during webbing wind-up and may not, therefore, rotate relative to the shaft 18 during wind-up. Thus, this safety device may not automatically lockup during wind-up regardless of the angular acceleration of the webbing shaft 18.

An auxiliary control lever 62 is provided which will operate to lock this device independently of the automatic inertia-operated locking means and the manual control means 63 and 64. If, for example, the device is utilized in an aircraft provided with ejection seats where the safety device is usually mounted on the seat, the pilot, while preparing for ejection, turns the lever 62 clockwise as viewed in FIG. 10. The pin 59 engages the projection 58 and thus raises the sear 49, allowing lock-dog finger 74 to pass under sear finger 55, while lock-dog 72 rotates to engage and lock the ratchet wheel 30. Manual control 63, 64 thereafter has no control over the device until auxiliary control lever 62 is returned to its normal position as shown in FIG. 10.

This inertia-operated safety device operates on rectilinear acceleration of the webbing 14, which, of course, is converted to angular acceleration of the shaft 18 and webbing wound thereon, the locking mechanism responding to a particular angular acceleration to automatically lock. For a given rectilinear acceleration of the webbing 14, the angular acceleration of the shaft 18 and webbing 14 wound thereon varies as the effective radius of the shaft and webbing varies. Thus, a certain rectilinear acceleration of the webbing, with the webbing almost unwound from the shaft 18, produces an angular acceleration of the shaft 18 which is much greater than if the webbing had been fully wound on the shaft 18. This, of course, would result in the device operating over an undesired range of rectilinear acceleration values rather than at one specific value of G, for example, 2 G's. There in included in the safety device a compensating mechanism for automatically compensating for variations in effective shaft and webbing radius by changing the angular acceleration at which the device will lock to ensure operation of this device at one particular rectilinear acceleration. The compensator screw 38 screwed into shaft 18 is provided with left-handed threads and is prevented from rotating since pin 40 engages the head 38' in one of its slots. Therefore, as shaft 18 rotates clockwise, as viewed in FIG. 9, in the webbing unwind direction, the compensator screw threads itself into the shaft 18 a distance determined by the head of the thread on the screw 38. The thrust plate spring 39 is thus progressively compressed to increase progressively the force on thrust plate 37, and thereby increase the coupling force on flywheel 31. It can thus be seen that, as the effective radius of the shaft 18 and webbing 14 wound thereon decreases to tend to lower the effective rectilinear acceleration needed to operate this device, the tension of thrust spring 39 increases to tend to raise the effective rectilinear acceleration needed to operate this device. When the shaft rotates in the windup direction, the head 38' moves outwardly from the end of shaft 18 and the tension of thrust spring 39 is decreased. This device is thus compensated to ensure operation at one particular pre-set rectilinear acceleration.

The above-described inertia-operated safety device provides for a manual lock and an automatic lock and for a manual release from both manual and automatic lock. In some instances of use, the manual lock and the manual unlock from the lock-up position are not necessary, there only being the requirement that the device be automatically unlocked at all times when an accelerating force of sufficient amplitude to operate the device is not present on the strap cable. The novel automatic device utilized to unlock the safety mechanism automatically is shown in FIGS. 12 and 12a, it being noted that the following structural elements disclosed above and utilized in the manual unlocking operation are omitted from the device and replaced by a simple "dog drag" spring 70: the main control shaft 63, external control lever 64, inner control lever 65, torque pin 66, dog retraction lever 67, control shaft spring 68, and pin 69. The U-shaped "dog drag" spring 70 is securely affixed to the lock dog 72, the fingers of this spring slidably gripping the sides of the ratchet wheel 31. This spring 70 senses the direction of rotation of the ratchet wheel 30, and, when the ratchet wheel is turning in a direction such that the strap is being pulled out from the safety device, the dog is urged in a direction to engage the ratchet wheel 30. When the ratchet wheel rotates in a direction to wind up the strap on the reel, the dog is urged in a direction to move away from the ratchet wheel 30. During the period that the strap is being played out from the device at an acceleration less than the predetermined acceleration of operation, the sear arm 55 engaging the finger 74 prevents the lock dog from engaging the ratchet wheel 30. When the predetermined acceleration is reached, the sear 49 is lifted and the lock dog 72 is carried into engagement with the ratchet teeth on the ratchet wheel 30 by the dog drag spring 70. When the ratchet wheel 30 turns in the wind-up rotational direction, the dog is moved away from the ratchet wheel and the sear arm 55 falls behind the finger 74, thus unlocking the reel.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An inertia-operated safety device for mounting in a vehicle to restrain the movement of a body within the vehicle when the body is subjected to accelerated movements relative to the vehicle comprising a tension member for coupling to the body, a reel on which said tension member is wound, yieldable resilient means coupled to said reel tensioned so as to urge said reel in the direction to wind up said tension member thereon, said reel being rotatable against the tension of the resilient means in a direction to unwind the tension member from the reel responsive to movements of the body, a flywheel rotatably mounted in axial alignment with said reel, yieldable means coupling said flywheel to said reel to rotate said flywheel in unison with said reel during rotation thereof in the unwind direction below a certain acceleration, said yieldable means yielding during rotation of said reel at said certain acceleration whereby said reel rotates relative to said flywheel, locking means operated in response to the yielding of said yieldable means for locking said reel against further rotation in the unwind direction, said locking means having a normal position it assumes when the reel is in an unlocked condition and a lock position when the reel has been locked against further unwind of the tension member, manually operated means for moving said locking means from said lock position to said normal position, and means operating to prevent relative rotation between said flywheel and said reel during that short period of time when said locking means is first moved from its lock position and being returned to its normal position.

2. An inertia-operated safety device for mounting in a vehicle to restrain the movement of a body within the vehicle when the body is subjected to accelerated movements relative to the vehicle comprising a tension member for coupling to the body, a reel on which said tension member is wound, yieldable resilient means coupled to said reel tensioned so as to urge said reel in the direction to wind up said tension member thereon, said reel being rotatable against the tension of the resilient means in a direction to unwind the tension member from the reel responsive to movements of the body, a flywheel rotatably mounted in axial alignment with said reel, yieldable means coupling said flywheel to said reel to rotate said flywheel in unison with said reel during rotation thereof in the unwind direction below a certain acceleration, said yieldable means yielding during rotation of said reel at said certain acceleration whereby said reel rotates relative to said flywheel, locking means operated in response to the yielding of said yieldable coupling means for locking said reel against further rotation in the unwind direction, said locking means including a spring-loaded lock dog, said lock dog having a normal position it assumes when the reel is in an unlocked condition and a lock position when the reel has been locked against further unwind of the tension member, manually operated means for moving said lock dog from said locked position to said normal position, and means controlled by said manually operated means for preventing relative rotation between said flywheel and said reel during that short period of time when said lock dog is first moved from its lock position and is being returned to its normal position.

3. An inertia-operated safety device for mounting in a vehicle to restrain the movement of a body within the vehicle when the body is subjected to accelerated movements relative to the vehicle comprising a tension member for coupling to the body, a reel on which said tension member is wound, yieldable resilient means coupled to said reel tensioned so as to urge said reel in the direction to wind up said tension member thereon, said reel being rotatable against the tension of the resilient means in a direction to unwind the tension member from the reel responsive to movements of the body, a flywheel rotatably mounted in axial alignment with said reel, a thrust plate mounted for rotational movement with said reel, yieldable means for coupling said thrust plate to said flywheel, said thrust plate driving said flywheel through said yieldable coupling means to rotate said flywheel in unison with said reel during rotation thereof in the unwind direction below a certain acceleration, said yieldable coupling means yielding during rotation of said reel at said certain acceleration whereby said reel and thrust plate rotate relative to said flywheel, locking means operated in response to the yielding of said yieldable coupling means for locking said reel against further rotation in the unwind direction, said locking means having a normal position it assumes when the reel is in an unlocked condition and a lock position when the reel has been locked against further unwind of the tension member, manually operated means for moving said locking means from said lock position to said normal position, and means controlled by said manually operated means operative to prevent said yieldable coupling means from yielding during that short period of time when said lock dog is first removed from its lock position and is being returned to its normal position, whereby said safety device is prevented from automatically locking up during that short period of time during manual release.

4. An inertia-operated safety device as claimed in claim 3 wherein said yieldable coupling means permits longitudinal axial movement of said thrust plate during relative rotation between said flywheel and said reel and thrust plate upon automatic lock-up, said means operative to prevent relative rotation between said flywheel and said reel and thrust plate during the period of release of said lock dog comprising a sear lever coupled to said thrust plate for preventing axial longitudinal movement of said thrust plate thereby preventing relative rotational movement between said flywheel and said reel and thrust plate.

5. An inertia-operated safety device as claimed in claim 4 wherein said yieldable coupling means includes a plurality of steel balls sandwiched between said thrust plate and said flywheel and nestling in indentations in the surfaces thereof and a spring for urging said thrust plate against said steel balls and flywheel, said steel balls moving out of said indentations on relative rotation between said flywheel and said reel and thrust plate and producing axial longitudinal movement of said thrust plate against said spring means.

References Cited in the file of this patent

UNITED STATES PATENTS

| | | |
|---|---|---|
| 2,845,234 | Cushman et al. | July 29, 1958 |
| 2,886,259 | Barecki | May 12, 1959 |
| 3,018,065 | Cushman et al. | Jan. 23, 1962 |

FOREIGN PATENTS

| | | |
|---|---|---|
| 805,358 | Great Britain | Dec. 3, 1958 |